United States Patent
Rutkowski et al.

(10) Patent No.: US 9,601,923 B2
(45) Date of Patent: Mar. 21, 2017

(54) CURRENT LIMIT MANAGEMENT FOR MULTI-FUNCTION SYSTEMS

(71) Applicant: FORD GLOBAL TECHNOLOGIES, LLC, Dearborn, MI (US)

(72) Inventors: Brian D. Rutkowski, Ypsilanti, MI (US); David J. Rutkowski, Grosse Ile, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 73 days.

(21) Appl. No.: 14/291,616

(22) Filed: May 30, 2014

(65) Prior Publication Data

US 2015/0349527 A1    Dec. 3, 2015

(51) Int. Cl.
| | |
|---|---|
| *H02J 1/14* | (2006.01) |
| *B62D 1/06* | (2006.01) |
| *B62D 15/02* | (2006.01) |
| *B60R 16/03* | (2006.01) |

(52) U.S. Cl.
CPC .............. *H02J 1/14* (2013.01); *B60R 16/03* (2013.01); *B62D 1/06* (2013.01); *B62D 15/025* (2013.01); *Y10T 307/461* (2015.04)

(58) Field of Classification Search
CPC ....... B62D 5/0463; B62D 7/159; B62D 6/008
USPC .......................................................... 701/41
See application file for complete search history.

(56) References Cited

U.S. PATENT DOCUMENTS

| | | | |
|---|---|---|---|
| 6,268,588 B1 | 7/2001 | Hazebrouck et al. | |
| 6,299,466 B1 | 10/2001 | Bolen et al. | |
| 6,495,799 B1 | 12/2002 | Pillsbury, IV et al. | |
| 6,664,517 B2 * | 12/2003 | Nagatomo | H05B 1/0236 219/204 |
| 6,762,394 B2 * | 7/2004 | Hobby | B62D 1/065 219/202 |
| 6,843,672 B2 * | 1/2005 | Kato | H01R 35/025 439/15 |
| 7,232,312 B2 | 6/2007 | Wade et al. | |

* cited by examiner

*Primary Examiner* — Jerrah Edwards
*Assistant Examiner* — Majdi Alsomiri
(74) *Attorney, Agent, or Firm* — Frank MacKenzie; Brooks Kushman P.C.

(57) ABSTRACT

Exemplary methods are disclosed, which may include providing a conductive component configured to conduct a current to at least two electrical systems or elements. Methods may further include determining one of the electrical elements as a low-priority system and a second one of the electrical elements as a high-priority system, measuring or estimating a current associated with the at least two electrical systems to establish the current exceeds a predetermined parameter, and deactivating the low-priority system in response to at least the determination of the current exceeding the predetermined parameter.

14 Claims, 3 Drawing Sheets

CURRENT LIMIT MANAGEMENT FOR MULTI-FUNCTION SYSTEMS

BACKGROUND

Electrical current for multifunctional systems, i.e., systems including separate component systems, may vary according to activation or use each of the component systems. In other words, current may increase or decrease according to whether and which component systems are using current. Accordingly, electrical conduits associated with the multifunctional systems must be capable of conducting current loads dictated by how the component systems are expected to be used.

Determining limits of system components based upon maximum usage may be inefficient by requiring greater system capabilities than are needed. For example, electrical current demands in a vehicle steering wheel system may include, as examples, those for an Active Front Steering (AFS) system and a heated steering wheel system. More specifically, an AFS system may generally alter steering inputs to change the relationship between steering wheel movements and responses of the steered wheels, e.g., so that different steering inputs have different resulting wheel angles depending on vehicle speed. Additionally, heated steering wheels may provide comfort during cold weather conditions by providing warmth to the extremities, i.e., hands and/or fingers, of a vehicle driver.

Simply designing the system under the assumption that both systems will always be active, i.e., that current will be needed for both systems at all times, is inefficient because both systems are not often used simultaneously. For example, during warm weather the heated steering wheel is typically not in use. Accordingly, using an electrical conduit that is large enough to handle simultaneous and constant use of both the AFS and heated steering wheel system will necessarily result in using a conduit that is too large and/or more expensive than is necessary for a large percentage of actual vehicle usage. Moreover, such a large conduit may not be practical for a confined space, e.g., within a steering wheel assembly.

At the same time, attempts to use a smaller conduit may sacrifice performance of one or both systems at some time when a vehicle operator has requested use of both systems. Deactivation of the AFS system in particular may be easily noticeable by the driver and may affect vehicle performance.

Accordingly, there is a need for an improved system that does not overdesign components while allowing usage of all component systems to the greatest extent possible.

SUMMARY

Various exemplary illustrations are provided of a method, which may include providing a conductive component having a predetermined limit, the conductive component configured to conduct a current to a plurality of electrical elements, and determining a low-priority system and a high-priority system included in the electrical elements. The method may further include measuring an operation parameter associated with the conductive component to establish the predetermined limit is exceeded, and deactivating the low-priority system in response to at least the determination of the predetermined limit being exceeded.

Exemplary illustrations are also directed to a vehicle and a steering wheel assembly for the same. An exemplary steering wheel assembly may include a conductive component having a predetermined limit, where the conductive component is configured to provide a current to a plurality of electrical elements. In some exemplary illustrations, the conductive component may include a fixed component and a rotating component configured to rotate relative to the fixed component. The steering wheel assembly may further include a processor configured to determine one of the electrical elements as a low-priority system and a second one of the electrical elements as a high-priority system, the processor configured to measure an operating parameter associated with the conductive component and selectively deactivate the low-priority system when a the operating parameter exceeds the predetermined limit.

BRIEF DESCRIPTION OF THE DRAWINGS

While the claims are not limited to the illustrated embodiments, an appreciation of various aspects is best gained through a discussion of various examples thereof. Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description. Exemplary embodiments of the present invention are described in detail by referring to the drawings as follows.

DETAILED DESCRIPTION

Figure 1A:
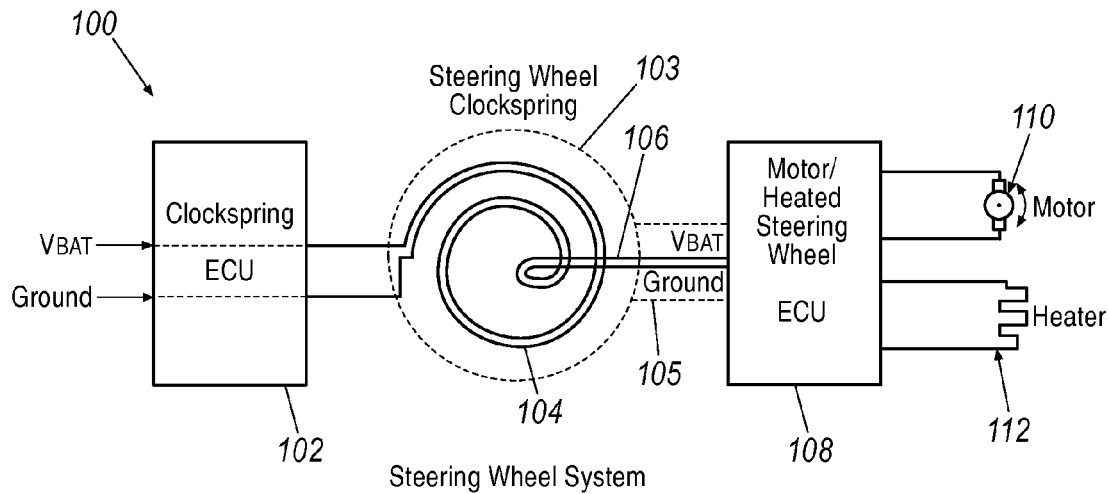
FIG. 1A is a schematic illustration of an exemplary electrical system, e.g., a steering wheel assembly, which has multiple components or subsystems included, e.g., an active front steering system and a heated steering wheel system.

Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limit or restrict the invention to the precise form and configuration shown in the drawings and disclosed in the following detailed description.

Figure 1B:
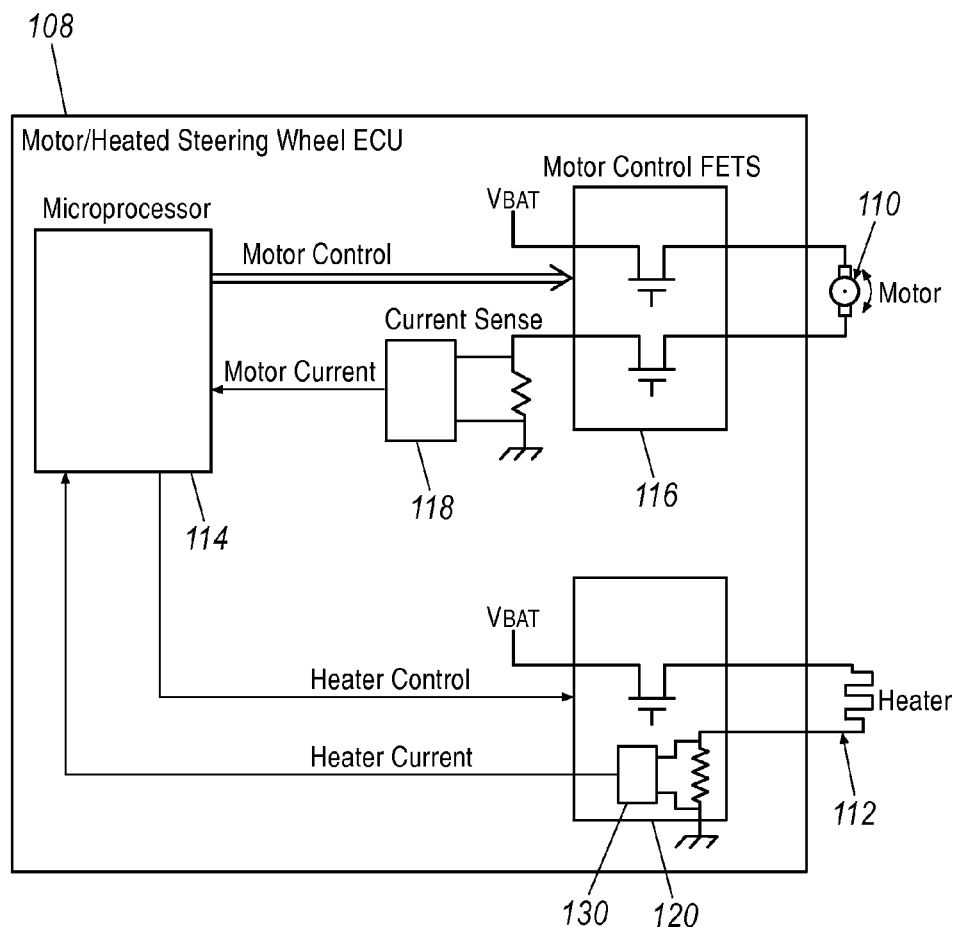
FIG. 1B is a schematic illustration of the exemplary electronic control unit of FIG. 1A.

Turning now to FIGS. 1A and 1B, an exemplary steering wheel assembly 100 is schematically illustrated. The steering wheel assembly 100 may be installed in a vehicle for generally providing steering inputs to one or more wheels of the vehicle. Steering wheel assembly 100 may generally include a fixed component 105 having a first conductive element 106, which is fixed with respect to a rotating component 103 having a second conductive element 104. In one exemplary illustration, fixed component 105 may be a steering wheel column or shaft. An exemplary rotating component 103 may include a steering wheel or any component thereof.

In one exemplary illustration, the conductive elements 104, 106 are included in a "clockspring" circuit or conductor. An exemplary conductive element or clockspring 104 may generally include an electrical wire or conductor which is wrapped circularly in such a manner to allow two electrical components which are electrically connected at either ends of the clockspring 104 to remain in electrical communication, while also allowing relative rotation between a fixed and a rotatable component. More specifically, the clockspring circuit 104 may have a first portion thereof which is fixed and thus includes the fixed component 105. A second portion of the clockspring circuit 104 may be wrapped around the first component, and may thus constitute the rotatable component 103. However, any other electrically conductive element or assembly may be employed to provide the fixed component 105 and rotatable components 103, e.g., a flexible circuit board or commutator and brush assembly.

Steering wheel assembly 100 may further include an electronic control unit 102, which generally receives an input voltage $v_{bat}$ (e.g., a battery voltage) and a ground input. The electronic control unit 102 is in electrical communication with the clockspring or conductive element 104. The conductive element 104 is in contact with or is otherwise in electrical communication with the first conductive element 106. Conductive element 106 is in further electrical communication with a second electrical control unit 108.

In one exemplary illustration, electrical control unit 108 is a motor and heated steering wheel electronic control unit. For example, the second electrical control unit 108 may be in communication with a motor 110 and a heater 112. More specifically, motor 110 may be an active steering motor that is configured to adjust steering inputs from a vehicle steering wheel (e.g., rotatable component 103) to one or more wheels (not shown) of a vehicle. In this manner, effects of steering inputs or vehicle reactions to manipulation of the steering wheel may be modified, e.g., to provide different steering inputs at different speeds. Heater element 112 may include any conductive elements, resistors, or other heating devices that may be convenient for providing heat to a steering wheel rim or other area of the steering wheel.

As described further below, electrical control unit 102 or electrical control unit 108 may be configured to selectively deactivate one or both of the electrical systems associated with the control unit 108. More specifically, in one exemplary approach ECU 108 is configured to selectively deactivate the heater 112 of the steering wheel assembly 100 in response to the determination that an operation limit has been exceeded by the steering wheel assembly 100. In another example, ECU 108 is configured to selectively deactivate the heater 112 of the steering wheel assembly 100 in response changes in current demands of the steering wheel assembly 100.

In some exemplary illustrations, system 100 may be capable of selectively deactivating components of the system, e.g., heater 112 or motor 110, in order to reduce overall current demands of the system over time. Moreover, in some exemplary approaches system 100 may temporarily deactivate one of the system components which is a lower priority than another component. In one example, a lower priority system or component may be determined based upon a visibility of the system or component in relation to other systems or components. More specifically, a less visible system, which is less easily perceived to a user, may be deactivated in favor of another of the systems in communication with the conductive component that is more easily perceived by the user. However, other methodologies for setting priorities between components or systems for deactivation may be employed. Merely as examples, priorities between the systems may be determined based upon frequency of use of the systems, or electrical demands of the systems. Additionally, priorities may be determined based upon dynamic factors such as operating temperatures of the components. More specifically, where certain systems or elements are exceeding temperature guidelines or acceptable operating temperatures, those systems may be deactivated. Moreover, while exemplary illustrations are provided below where a single system or component is identified as having a lower priority than another system or component, in other exemplary approaches a plurality of systems or components may be ranked from a lowest-priority to a highest-priority. In such approaches, multiple systems or components may be selectively deactivated in favor of one or more higher priority system(s).

In one exemplary illustration, as will be further described below, steering wheel assembly 100 may selectively deactivate the heater 112, i.e., deactivating the heated steering wheel function, in response to current demands of both the heater 112 and the motor 110. In such examples, temporary loss or deactivation of the heated steering function may be less perceptible to a driver as compared with deactivation of the motor 110 of the AFS, and thus the heater 112 may receive a lower priority than the motor 110. More specifically, though the heater 112 may be turned off temporarily, residual heat present in the heater 112 may allow the deactivation of the heater 112 to pass unnoticed by the driver. By contrast, deactivation of the motor 110 of the AFS is likely to be instantly noticed by the driver, e.g., by a change in vehicle responsiveness or by steering "feel" of the vehicle as felt by the driver through the steering wheel. While the above examples are provided in the context of a steering wheel, system 100 comprising a heater 112 and motor 110, these examples are readily applicable to any electrical system involving multiple subsystems with different levels of visibility to a user of the subsystems.

In some exemplary approaches, a steering wheel assembly 100 may selectively deactivate a subsystem which draws a current less frequently than another of the subsystems. For example, motor 110 may be likely to be active more often than the heater 112. Accordingly, selective deactivation of one of the subsystems may be determined based at least in part, which system is less likely to be needed on an ongoing basis. In such examples, the subsystem to be deactivated in response to current demands may be thought of as a relatively low-demand or low-priority system, e.g., heater 112, while the other system may be a high-demand high-priority system, e.g., motor 110.

Various methodologies may be employed for deactivation of one or more subsystems included in an exemplary system 100. For example, one of the subsystems may be deactivated when a current associated with the overall system 100 exceeds a predetermined magnitude. In one exemplary illustration, if current powering the heater 112 and motor 110 which is conducted along the first conductive element 104 and/or second conductive element 106 exceeds a predetermined amount, the lower-priority system, e.g., the lower-demand or less visible system, may be deactivated at least until current demands of the overall system 100 falls below the predetermined amount. In another example, a relevant operating parameter may include a temperature of the first conductive element 104 and/or the second conductive element 106, and a low-priority system may be deactivated upon the temperature exceeding a predetermined limit. For example, in some exemplary approaches, cooling fans may be provided for one or more systems or elements that are included in the plurality of systems or elements drawing power from a conductive component. The cooling fans may generally provide airflow to their associated systems or elements in order to maintain an operating temperature of the associated system/element below a predetermined limit. In some examples, cooling fans may be assigned a low priority, e.g., when their associated system/element is below the predetermined limit temperature. Accordingly, temperature may be used to assign priorities between a plurality of systems or elements, Priorities between the systems or elements may also be determined based on a visibility or ease with which a customer may detect deactivation of the systems/elements in relation to other systems/elements. For example, a period of time the current flowing through the motor 110 and heater 112 will exceed a relevant threshold may be less than a few seconds, or at least a short enough period of time that the actual steering wheel temperature does not noticeably change, despite the temporary deactivation of the heater 112. Accordingly, any effect of interrupting the heater 112 on the steering wheel temperature is highly unlikely to be observed by the driver, and on that basis the heater 112 may be assigned a lower priority than the motor 110.

Turning now to FIG. 1B, exemplary ECU 108 is illustrated in further detail. ECU 108 may include a microprocessor 114 in communication with motor control 116 and heater control 120. The motor control 116 and heater control 120 may be configured to selectively activate/deactivate the motor 110 and heater 112, respectively. Additionally, a current sensor 118 may be provided which measures current to the motor 110. Moreover, heater control 120 may be configured to monitor current flowing to the heater 112. For example, a current sensor 130 may be provided that monitors a magnitude of current flowing to the heater 112. Accordingly, the microprocessor 114 may generally monitor current demands of the overall system 100, including at least the motor 110 and heater 112. In another exemplary approach, thermal sensors configured to detect a temperature of the first conductive component 104 or second conductive component 106 may be provided, in which case the microprocessor 114 may generally monitor thermal demands of the overall system 100, including at least the motor 110 and heater 112.

Figure 2:
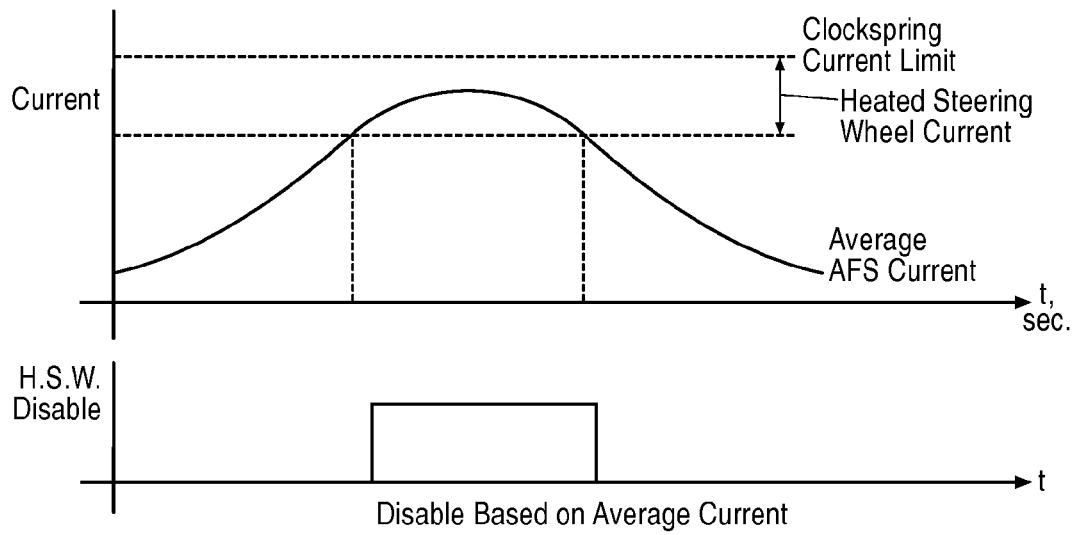
FIG. 2 is a graphical representation of an exemplary strategy for deactivating a component or subsystem of the system of FIG. 1A.

As noted above, ECU 108 may be configured to temporarily disable heater 112 in response to an operating parameter, e.g., current or temperature, exceeding a predetermined amount. In another exemplary illustration, one of the subsystems included in the steering wheel system 100 may be disabled based upon average AFS current, e.g., a time-based filtered current to the motor 110 using the sensor 118 as the input. For example, as illustrated in FIG. 2, in this approach the microprocessor 114 may calculate the average AFS current, and compare it with a conductive component or clockspring 104 limit, e.g., a maximum current capability of the clockspring 104, minus the heated steering current. If the average AFS current or motor 110 current exceeds this limit, then the heater 112 may be disabled.

Figure 3:
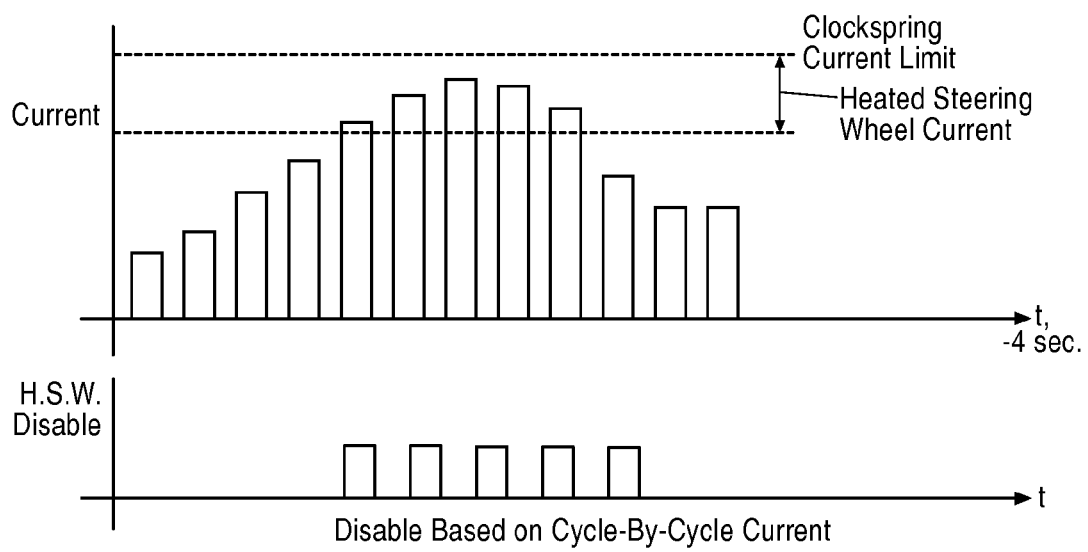
FIG. 3 is a graphical representation of another exemplary strategy for deactivating a component or subsystem of the system of FIG. 1A.

In another exemplary illustration, temporary disablement may be based on a cycle by cycle AFS current or motor 110 current. For example, as shown in FIG. 3, actual motor 110 current may be measured and compared to the clockspring limit current minus the heater 112 current. If the instantaneous current exceeds this limit, then the heated steering wheel, i.e., heater 112, is disabled.

In another exemplary approach, an over-current error must be present for a period of time before disablement may occur. Additionally, to re-enable the heater 112, the over-current error needs to be cleared for a period of time. In this manner, extremely short current spikes or reductions, which may be tolerable by the system 100, will not result in rapid cycling on and off of the heater 112.

Another exemplary illustration may employ an energy-based disablement and time-based re-enablement. For example, the heater 112 may be disabled when an integrated squared current error exceeds a predetermined threshold. The heater 112 may then be re-enabled when the over-current error is cleared or is otherwise not present for a predetermined time.

In still another exemplary illustration, a spring thermal model using a temperature-based enable/disable feature may be employed. More specifically, if a temperature of the clockspring 104 exceeds a predetermined amount, the heater 112 may be disabled, at least until such time as the temperature of the clockspring 104 falls below the predetermined amount.

Figure 4:
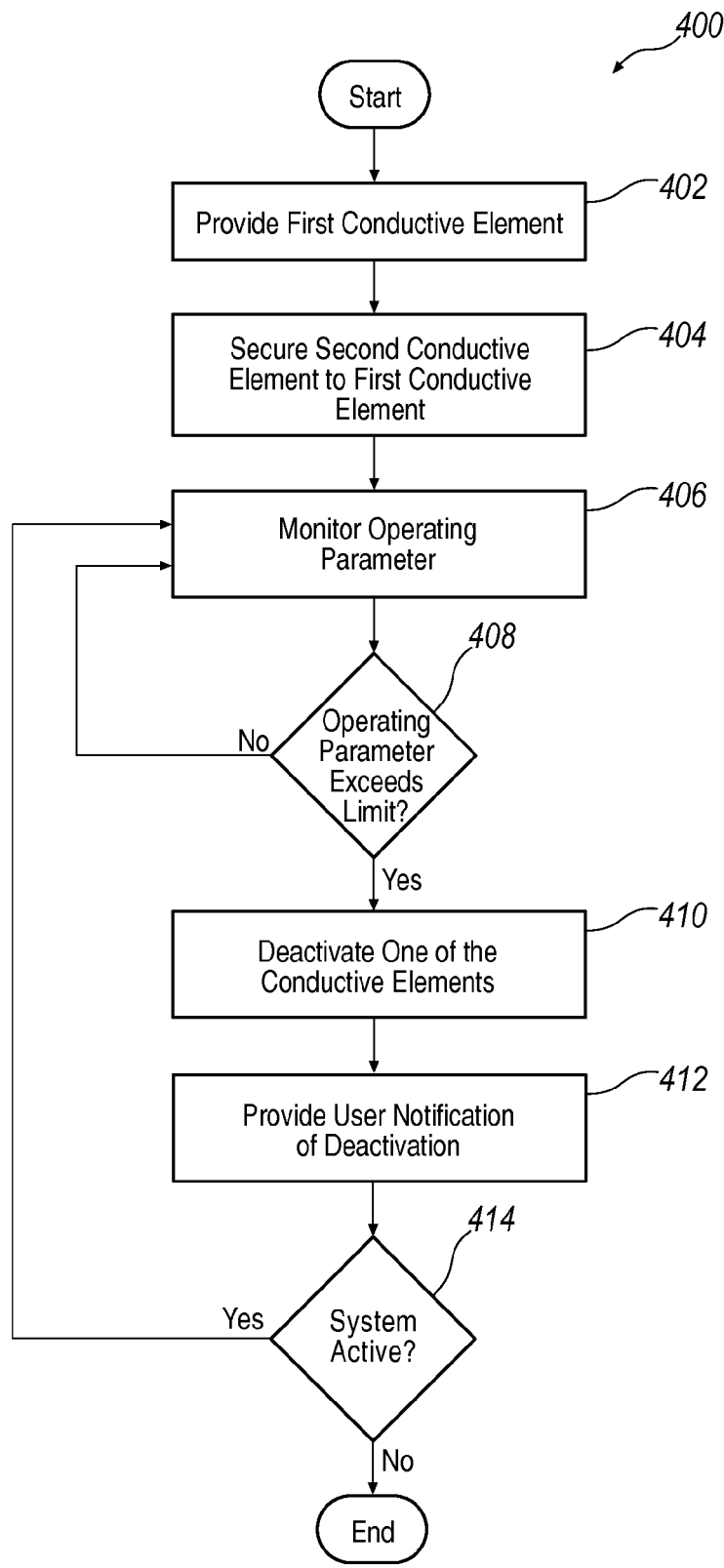
FIG. 4 is an exemplary process flow diagram for a method of deactivating components or subsystems included in a system.

Turning now to FIG. 4, an exemplary process 400 for selectively deactivating subsystems of a system, e.g., steering wheel assembly 100, is described. Process 400 may begin at block 402, where a first conductive component or element is provided. For example, as described above a conductive element 106 may be disposed within a steering wheel column.

Proceeding to block 404, another conductive element may be secured to the first conductive element. For example, as described above a conductive element 106 may be in electrical communication with a first conductive element 104. In another example, a clockspring 104 may be in electrical communication with a conductor or conduit configured to transmit electrical current to one or more electrical subsystems. For example, a clockspring 104 may generally conduct electrical current to a motor 110 of an active front steering system and also a heating element 112 of a heated steering wheel. In some exemplary approaches, e.g. where a clockspring is used, the first and second conductive components may be provided in a generally single conductive circuit or conductor having portions representing the first conductive component 104 and second conductive component 106. Additionally, in such examples one conductive component 104 may be disposed within or otherwise correspond to the rotatable component 103, e.g., a steering wheel, while another conductive component 106 corresponds to the fixed component 105, e.g., a steering column, around which the rotatable component 103 rotates. Process 400 may then proceed to block 406.

At block 406, an operating parameter associated with the first and second conductive elements may be monitored. For example, as described above ECU 108 may generally monitor current demands associated with the motor 110 and/or the heater 112. In another example, a thermal load or temperature of the system 100 or either of the conductive components may be monitored.

Proceeding to block 408, process 400 may query whether the measured parameter exceeds a predetermined limit. For example, process 400 may query whether a measured current exceeds a predetermined current limit. As described above, ECU 108 may determine whether current demands of the system 100 exceed a predetermined limit or magnitude. In another exemplary illustration, one of the subsystems included in the steering wheel system 100 may be disabled based upon average AFS current, e.g., current to the motor 110 as determined by the sensor 118. More specifically, in this approach the microprocessor 114 may calculate the average AFS current, and compare it with the clockspring 104 limit minus the heated steering current, as illustrated in FIG. 2. Alternatively, disablement may be based on a cycle-by-cycle AFS current or motor 110 current. For example, as shown in FIG. 3, actual motor 110 current may be measured and compared to the clockspring current limit minus the heater 112 current. In another example, an over-current error must be present for a period of time before disablement may occur. Additionally, to re-enable the heater 112, the over-current error needs to be cleared for a period of time. Other examples may employ energy-based, time-based, or temperature-based disablement and/or enablement strategies, as discussed above.

Where the operating parameter, e.g., a measured current, exceeds a predetermined limit or parameter, process 400 may proceed to block 410, where one of the conductive elements is disabled. Alternatively, if the operating parameter is below the predetermined limit, process 400 may proceed to block 406 to continue monitoring the relevant current parameter(s).

At block 410, at least one of the conductive elements or associated subsystem may be disabled. For example, heater 112 may be disabled as described above. Moreover, the conductive element or subsystem may be selected based at least in part upon a priority of the deactivated subsystem in relation to another conductive element or subsystem in system 100. For example, where a user is unlikely to notice a temporary deactivation, e.g., of the heater 112, the particular system elements that are disabled may be selected based at least in part upon that factor. Additionally, as noted above the plurality of elements/systems may be ranked from a lowest priority system to a highest priority system. In such examples, lower priority system(s) may be deactivated, and in some cases a lowest priority system may be deactivated.

Proceeding to block 412, a user notification may be provided of the deactivation resulting from block 410. For example, a warning light, audible alarm, or haptic feedback may be provided in order to allow the user to perceive that the system 100 is working. In some examples, a user notification may be desired to alert a user that the system is working, while in other exemplary approaches it may be more desirable to have the system work without being perceived by the user. Process 400 may then proceed to block 414.

At block 414, process 400 may query whether either system(s) are active, e.g., whether an ignition of an associated vehicle is turned on, or whether any component system(s) of the system 100 are turned on or activated. If the query result is yes, i.e., a vehicle or system is on or in operation, process 400 may proceed back to block 406 to continue monitoring current in the system. If on the other hand the query result is no, process 400 may terminate.

In some exemplary approaches, the exemplary methods described herein may employ a computer or a computer readable storage medium implementing the various methods and processes described herein, e.g., process 400. In general, computing systems and/or devices, such as the processor(s) 108 and/or 102, or microprocessor 114, merely as examples, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., and the Android operating system developed by the Open Handset Alliance.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The exemplary illustrations are not limited to the previously described examples. Rather, a plurality of variants and modifications are possible, which also make use of the ideas of the exemplary illustrations and therefore fall within the protective scope. Accordingly, it is to be understood that the above description is intended to be illustrative and not restrictive.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," etc. should be read to recite one or more of the indicated elements unless a claim recites an explicit limitation to the contrary.

What is claimed is:

1. A method, comprising:
   providing a clockspring circuit having a predetermined current limit and including a fixed portion defining a steering wheel column and a rotating portion defining a steering wheel configured to rotate relative to the steering wheel column, the clockspring circuit configured to conduct current to a plurality of electrical elements including a steering wheel heating device and an active steering system;
   determining a low-priority system and a high-priority system included in the electrical elements;
   measuring current through the clockspring circuit to establish the predetermined current limit is exceeded; and
   deactivating the low-priority system in response to at least the determination of the predetermined current limit being exceeded.

2. The method of claim 1, wherein the low-priority system is determined based at least in part upon a visibility of the low-priority system relative to the high-priority system.

3. The method of claim 1, wherein the low-priority system is determined based at least in part upon a frequency that current is drawn by the low-priority system relative to the high-priority system.

4. The method of claim 1, wherein deactivating the one of the electrical elements further includes determining the one of the electrical elements to be a lower visibility system relative to the other electrical system such that intermittent deactivation of the lower visibility system is not readily perceived by a user of the clockspring circuit.

5. The method of claim 1, further comprising providing a user notification of the deactivation of the low-priority system.

6. The method of claim 1, further comprising re-activating the low-priority system.

7. The method of claim 6, wherein the low-priority system is reactivated in response to the measured current falling below the predetermined current limit for a predetermined period of time.

8. The method of claim 1, wherein the low-priority system is deactivated only in response to the predetermined current limit being exceeded for a predetermined period of time.

9. The method of claim 1, further comprising ranking the plurality of electrical elements from a lowest-priority to a highest-priority.

10. The method of claim 9, wherein deactivating the low-priority system includes deactivating the lowest-priority system.

11. The method of claim 1, further comprising determining at least two low-priority systems, and deactivating the at least two low-priority systems in response to at least the determination of the predetermined current limit being exceeded.

12. A steering wheel assembly, comprising:
    a conductive component having a predetermined current limit to provide current to first and second electrical elements; and
    a processor configured to:
       determine the first electrical element as a low-priority system and the second electrical element as a high-priority system, wherein the low-priority system draws current less frequently than the high-priority system,
       measure current of the conductive component, and
       deactivate the low-priority system when the measured current exceeds the limit.

13. The steering wheel assembly of claim 12, wherein the conductive component includes a clockspring circuit.

14. A vehicle, comprising:
    a steering wheel assembly, including a conductive component having a predetermined current limit, the conductive component configured to provide current to a plurality of electrical elements, the conductive component including a fixed component and a rotating component configured to rotate relative to the fixed component; and
    a processor configured to:
       determine one of the electrical elements as a low-priority system and a second one of the electrical elements as a high-priority system, wherein the low-priority system draws current less frequently than the high-priority system,
       measure current associated with the conductive component and
       selectively deactivate the low-priority system when the measured current exceeds the predetermined current limit.

* * * * *